United States Patent [19]

Pax

[11] Patent Number: 5,065,407
[45] Date of Patent: Nov. 12, 1991

[54] DIFFRACTION FILTERED LARGE MODE LASER RESONATOR

[75] Inventor: Paul H. Pax, San Francisco, Calif.

[73] Assignee: Continuum Electro-Optics, Inc., Santa Clara, Calif.

[21] Appl. No.: 508,780

[22] Filed: Apr. 12, 1990

[51] Int. Cl.$^5$ ............................................. H01S 3/08
[52] U.S. Cl. .................................... 372/103; 372/108; 372/95
[58] Field of Search .................... 372/103, 92, 108, 19, 372/95

[56] References Cited

U.S. PATENT DOCUMENTS

| 4,787,092 | 11/1988 | Gobbi et al. | 372/95 |
| 4,868,515 | 9/1989 | Reintjes et al. | 372/95 |
| 4,942,588 | 7/1990 | Yasui et al. | 372/103 |
| 5,012,483 | 4/1991 | Reintjes et al. | 372/103 |

OTHER PUBLICATIONS

Gobbi et al., "A Novel Unstable Resonator Configuration with a Self Filtering Aperture", *Optics Communications*, vol. 52, No. 3, Dec. 1, 1984, pp. 195–198.

Gobbi et al., "Stable Telescopic Resonators, Unstable Resonators and New Cavity Designs Applied to High Energy Laser Engineering", *SPIE*, vol. 492, ECOOSA (Amsterdam 1984), pp. 68–78.

Siegman, *Lasers*, University Science Books, Mill Valley, California, 1986, pp. 558–562 and 744–749.

Bianchi et al., "Characterization of a Modified SFUR Nd:YAG Oscillator in Various Pulsed Regimes", *SPIE*, vol. 701, ECOOSA (Florence 1986), pp. 132–135.

DiLazzaro et al., "A Generalization of the Self-Filtering Unstable Resonator", *IEEE Journal of Quantum Electronics*, vol. 24, No. 8, Aug. 1988, pp. 1543–1547.

Pax et al., "High Energy Cavity Dumped Active/Passive Mode-Locked Pulsed Nd:YAG Laser", Poster Paper, 1989 Technical Digest Series, vol. 11, Conference on Lasers and Electro-Optics (CLEO), Apr. 24, 1989, pp. 198–199.

Min et al., "Confocal Postive Branch≧Filtering Unstable Resonator for Nd:YAG Laser", *Optics Communications*, vol. 74, No. 1.2, Dec. 1, 1989, pp. 79–83.

Primary Examiner—William L. Sikes
Assistant Examiner—Susan S. Morse
Attorney, Agent, or Firm—Majestic, Parsons, Siebert & Hsue

[57] ABSTRACT

A laser resonator that is geometrically stable by classical definition is provided with beneficial characteristics of an unstable type through the use of a novel implementation of spatial filtering. A pinhole aperture is provided as part of, or on conjunction with, a mirror at one end of the cavity to cause light reflected from the mirror to diverge as it is directed toward the other end of the cavity. A spot focus of light, as usually found in spatial filters, is not utilized. The result is a laser cavity structure which provides a large mode beam within the cavity, a good quality output beam having a smoothly varying intensity distribution across it and which is easy to align.

24 Claims, 3 Drawing Sheets

REPRESENTATIVE BEAM PROFILES

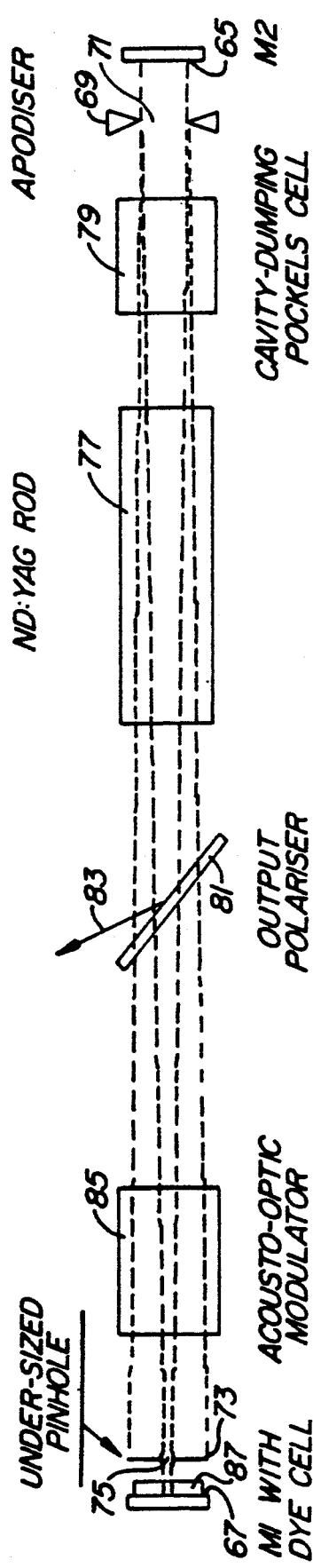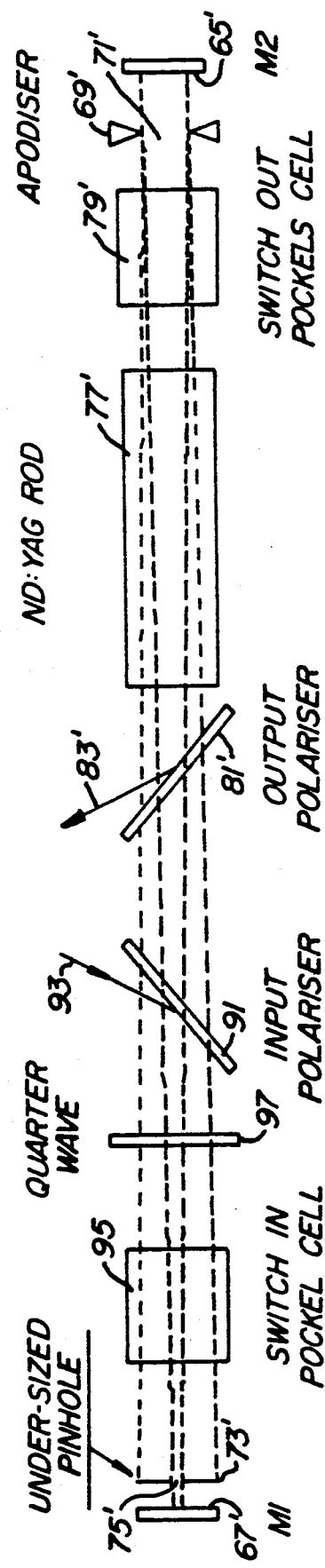

DIFFRACTION FILTERED LARGE MODE LASER RESONATOR

BACKGROUND OF THE INVENTION

This invention is related generally to the art of the construction and operation of lasers, and, more specifically, to the structure of a laser resonating cavity utilizing spatial filtering.

The basic structure common to nearly all lasers is well known. A light amplifying medium is positioned between two mirrors that forms a cavity between them that is resonant to oscillations of light having a wavelength desired to be produced. An output beam of the laser can be derived through one of the mirrors, in which case it is made to be only partially reflective, or around one of the mirrors, in which case it is made totally reflective. Alternatively, an output can be obtained by use of a beam splitter in the cavity or by cavity dumping. The light amplifying material may be in a gaseous, liquid or solid form, depending upon the type of laser and its specific desired characteristics. Lasers are also made to either operate with a continuous wave (c.w.) light output, or are designed to provide repetitive high energy light pulses, the structure of each of these types of lasers being quite different.

Laser oscillator resonators are generally classified into one of two basic types. A "stable" resonator has its end mirrors shaped to confine the beam within the resonant cavity. Oscillation is generally limited to the fundamental, transverse mode ($TEM_{00}$) by the use of an appropriate aperture within the cavity. The laser output beam has a smooth Gaussian intensity profile across it, a very desirable characteristic. However, the controlled size of the laser beam within the oscillator is very small unless either the resonant cavity is made to be much longer than usually desired or other optical elements are used in the cavity with undesirable side effects. A small beam necessarily interacts with only a limited volume of the light amplifying material. The result is a laser output beam with limited energy. However, its intensity profile is a Gaussian function, so stable resonators are often used where a high energy output is not so important.

The second general type of laser oscillator resonator is referred to as an "unstable" type. In this type, the beam is not confined within the cavity but escapes after a limited number of round trips, contrary to the stable resonator. The cross-sectional size of the beam increases during each round trip through the resonator. Such a resonator has an advantage of developing a higher energy output beam because it interacts with a full volume of the laser rod. However, it has the disadvantage of providing a laser output beam with a poor intensity distribution across it because of the edge diffraction effects of an abrupt aperture with which the expanding beam necessarily interacts.

Whether a given laser resonating cavity is defined as a stable or unstable type depends entirely upon dimensions of the geometric optics within the resonator. Specifically, the radii of curvature of the end mirrors and the resonator cavity optical length between mirrors determine whether it operates as a stable or unstable type. A mathematical treatment of this is set forth in a reference book by Professor Anthony E. Siegman, Lasers. University Science Books, Mill Valley, Calif., 1986, specifically at pages 561-562 and 744-749.

A great deal of effort is being directed toward the development of a resonant cavity that combines the advantages of the stable and unstable types while leaving their disadvantages behind. Particularly, it is desired to obtain the high power output of the unstable resonator with the beam quality of the stable resonator. One approach that has been pursued in various configurations is to use an unstable resonator type, for its high power and efficient use of the amplifier medium, but with inclusion of spatial filtering within the resonator to improve the quality of its output beam, primarily the intensity distribution across it. One of these configurations is a negative branch confocal, self-filtering unstable resonator, commonly referenced as a "SFUR". This configuration is described, for example, by Gobbi et al., *Optics Communications*, Volume 52, No. 3, 1 December 1984, pages 195-198, and in U.S. Pat. No. 4,787,092 —Gobbi et al. (1988). In this configuration, one of the end mirrors causes the light in the resonator to come to a focus at a small pinhole in a spatial filter arrangement. Although this configuration has been recognized as a significant advance, it suffers from a disadvantage that precise alignment is required between the pinhole spatial filter and the spot focus of the end mirror. This can be difficult to maintain in a commercial product.

Therefore, it is a primary object of the present invention to provide a laser resonator structure which overcomes this disadvantage.

It is a more general object of the present invention to provide a laser resonator structure that efficiently utilizes the amplifying media therein but which, at the same time, provides an output beam having a very smooth intensity distribution across it.

It is another object of the present invention to provide a laser resonator that is simple in construction, reliable and easy to operate, and which permits a wide range of specific design parameters without affecting its advantageous operation.

SUMMARY OF THE INVENTION

These and additional objects are accomplished by the present invention wherein, briefly and generally, edge diffraction effects of a small limiting aperture at one end of the resonator are utilized to substantially entirely control the divergence of the resonator beam travelling away from the aperture, without the necessity for any particular mirror curvature at that end of the resonator to control that divergence. This aperture controlled divergence, along with utilizing a defined curvature of the mirror and a cooperating large aperture at an opposite end of the resonator, results in making efficient use of the amplifying media by filling it. The two apertures cooperate to form a spatial filter without the disadvantage of forming a point focus. This eliminates undesirable concentrations of energy that can limit the amount of power at which the resonator can be operated in order to avoid damage.

The limiting aperture can alternatively take the form of a pinhole in front of a larger mirror, as close to its surface as practical, or a small mirror with non-reflecting areas around it. Since the limiting aperture is illuminated by a beam having a crosssectional area that is many times that of the aperture, there is a significant energy loss at the aperture. Therefore, this structure has an application where some limitation must be provided on peak power in order to avoid damaging elements within the resonator. Further, the length of the resonator and other parameters have fewer constraints than the SFUR design, without sacrificing the quality of the intensity profile of the output beam. The resonator configuration according to the present invention has a wide application, including use in a laser source or regenerative amplifier, particularly a laser source utilizing a dye cell positioned between a pinhole aperture and its associated end mirror where the beam intensity profile is highly uniform.

The classical definitions for stable and unstable types of resonators do not adequately characterize the resonator structure according to the present invention. It has the advantages of an unstable resonator by filling the laser rod or other amplifying medium with the oscillating light beam. This makes efficient use of the amplifying medium. This does not occur in a classical stable resonator. However, the resonator structure of the present invention also controls the oscillating beam profile so that an output has a smooth intensity distribution across it, very similar to the $TEM_{00}$. This is not a characteristic of a classical unstable resonator, although, as pointed out previously, others have devoted a great deal of effort to correcting this flaw in an unstable resonator.

It is the use of the limiting aperture in the resonator of the present invention, rather than the curvature of an end mirror or lens, to control divergence of the beam passing in one direction through the resonator that makes it difficult to classify by the classical definitions. This technique can be used with either a stable or unstable cavity mirror configuration. This is contrary to the primary thrust of current laser developments where specific improvements are being made within the definitions of either the stable or unstable type of resonator.

Additional objects, advantages and features of the present invention will become apparent from the following description of its preferred embodiments, which description should be taken in conjunction with the accompanying drawings.

BRIEF DESCRIPTION OF THE DRAWINGS

FIG. 3 illustrates a laser utilizing the resonator according to the embodiment of FIG. 1; and FIG. 4 illustrates a regenerative amplifier utilizing the resonator embodiment of FIG. 1.

DESCRIPTION OF THE PREFERRED EMBODIMENTS

Figure 1:
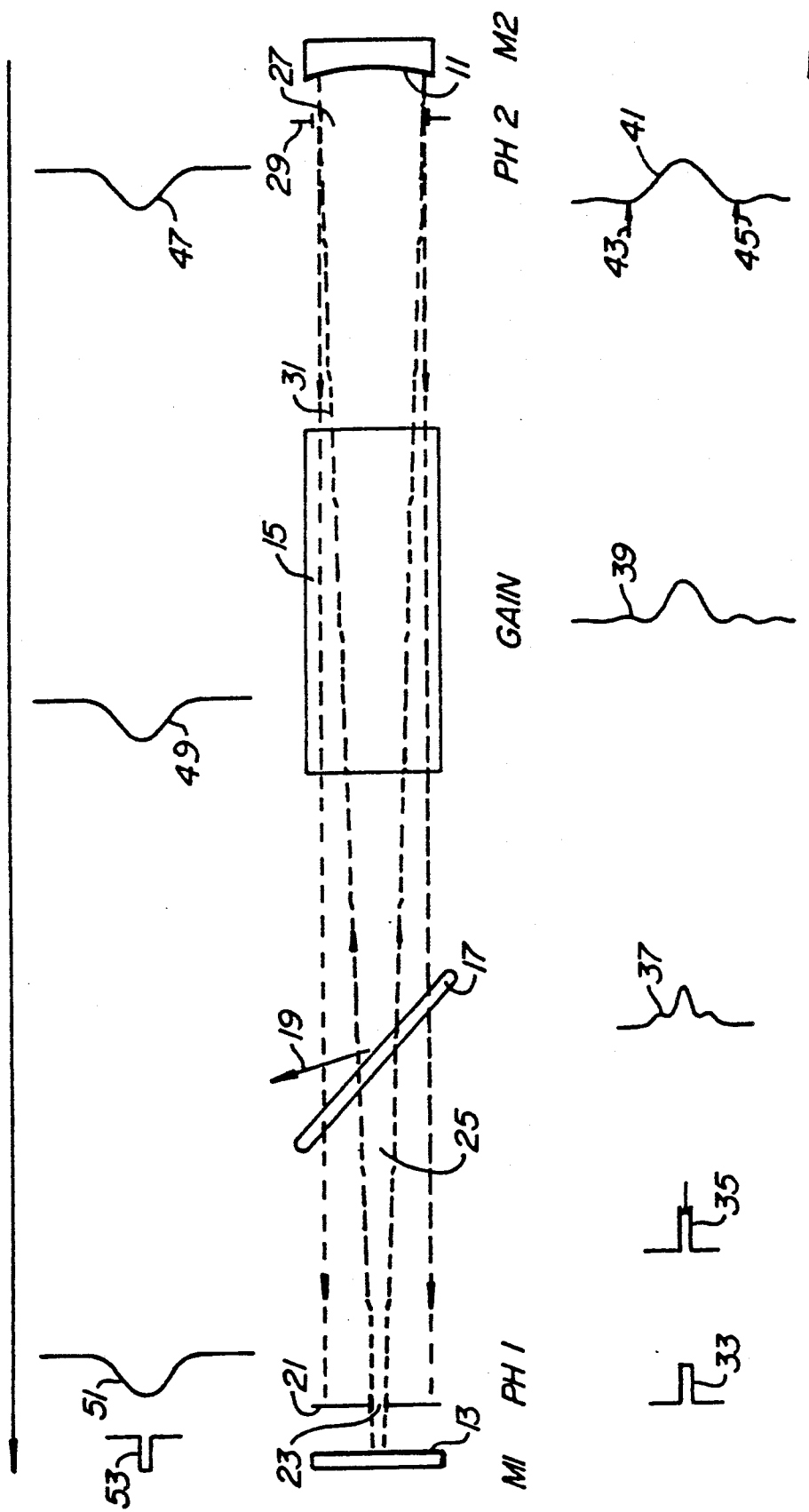
FIG. 1 schematically illustrates a resonator utilizing the present invention, according to a first embodiment.

Referring to FIG. 1, a resonator is bounded at one end by a concave reflective surface 11 and at an opposite end by a substantially planar mirror 13. An amplifying medium 15 is provided within the resonator cavity. A common material for the amplifying medium 15 utilized in pulsed lasers is a rod of neodymium doped yttrium aluminum garnet (Nd:YAG). A central axis of such a rod defines the axis of the laser cavity with which all other elements are aligned. In order to extract some of the light oscillating between the mirrors 11 and 13, an appropriate, partially reflecting optical element 17 directs an output beam 19 out of the resonator.

Rather than the mirror 13 being shaped to control the curvature of the wavefront reflected from it back toward the other end of the resonator, as is the usual resonator arrangement, an opaque mask 21 is positioned in front of the mirror 13. The mask 21 includes a pinhole limiting aperture 23 aligned o the axis of the resonator. The amount of the divergence of the beam 25 depends upon the size of the aperture 23. It is diffraction at the edges of the aperture 23 that causes a beam 25 to diverge as it travels in a direction away from the mask 21. The aperture 23 is preferably a very small, circular aperture whose radius is controlled for the desired divergence. The amount of divergence is controlled so that the central lobe of the beam 25 fills a second limiting aperture 27 in a mask 29 provided at an opposite end of the resonator, in front of convex mirror 11. The apertures 23 and 27, separated by a given distance, constitute a spatial filter. The length of the resonator example of FIG. 1 extends between the mirror 11 at one end and the mask 21 at the opposite end.

An alternative to the arrangement of FIG. 1 for extracting the output beam can improve its efficiency. In place of the element 17 being used, the mask 21 can be made reflective and shaped in a manner to direct a beam out of the cavity.

The light beam 25 is reflected from the mirror 11 as a beam 31 which, after passing through the amplifying medium 15 and other optical elements that might exist in the resonator cavity, strikes the mask 21 at an opposite end of the resonator. Only a small portion of that beam strikes the mirror 1 because of the limiting aperture 23. That portion is then returned back through the aperture 23 and becomes the diverging beam 25. This arrangement allows the divergence of the beam 25, curvature of the mirror 11, and length of the cavity to be selected so that the beam 31 is substantially collimated as it passes from one end to the other. Collimation of the beam 31 is usually desirable but not necessary. In any event, this arrangement allows control of the cross-sectional extent of the beams 25 and 31 in a manner that avoids them striking the outer edge of the amplifying medium 15 or other edges within the cavity that can cause undesired edge diffraction effects with a resultant degradation of intensity profile of the output beam 19. This allows full utilization of the volume of the amplifying medium 15 by passing the beam 31 through it with a size that is just slightly less than the outer dimensions of the medium 15.

FIG. 1 also includes representative intensity profiles across the oscillating beam within the resonator cavity. A profile 33 illustrates the intensity distribution across the beam 25 immediately after it passes through the aperture 23. It is a step function, or "top hat", distribution. A profile 35 shows this distribution to begin to change as a function of distance of the beam 25 from the aperture 23. A further distance away gives a different profile 37, and yet a further distance away gives a profile 39. The intensity profile across the beam is becoming smoother as a function of distance away from the diffracting aperture 23, until a distribution 41, known as an Airy pattern, occurs as the beam 25 approaches the much larger circular aperture 27 at the other end. The aperture 27 preferably has a diameter whose edges coincide with the substantial zero intensity level that surrounds a central lobe of the intensity distribution 41. The zero level is indicated by an arrow 43 on one side of the central lobe and by an arrow 45 on the other side of that lobe, in FIG. 1. This alignment minimizes or even eliminates diffraction at the edge of the aperture 27 since the intensity level there is substantially zero. Both of the apertures 23 and 27 are sharp-edged in this example, step intensity function types, although they could be made to have a gradually changing opacity as a function of radius in some applications.

For the beam 31 reflected from the mirror 11, its intensity distribution is a very smooth one all along the length of the beam, as indicated by intensity profiles 47, 49 and 51. The profile 51 shows a distribution of the beam 31 as it strikes the mask 21. An intensity distribution 53 results after the beam 31 passes through the aperture 23 and before it strikes the mirror 13. Since the aperture 23 is desirably made to be very small, it selects only a central portion of the intensity distribution 51 across which the intensity is substantially uniform. Thus, the intensity profile 53 is a "top hat".

Figure 2:
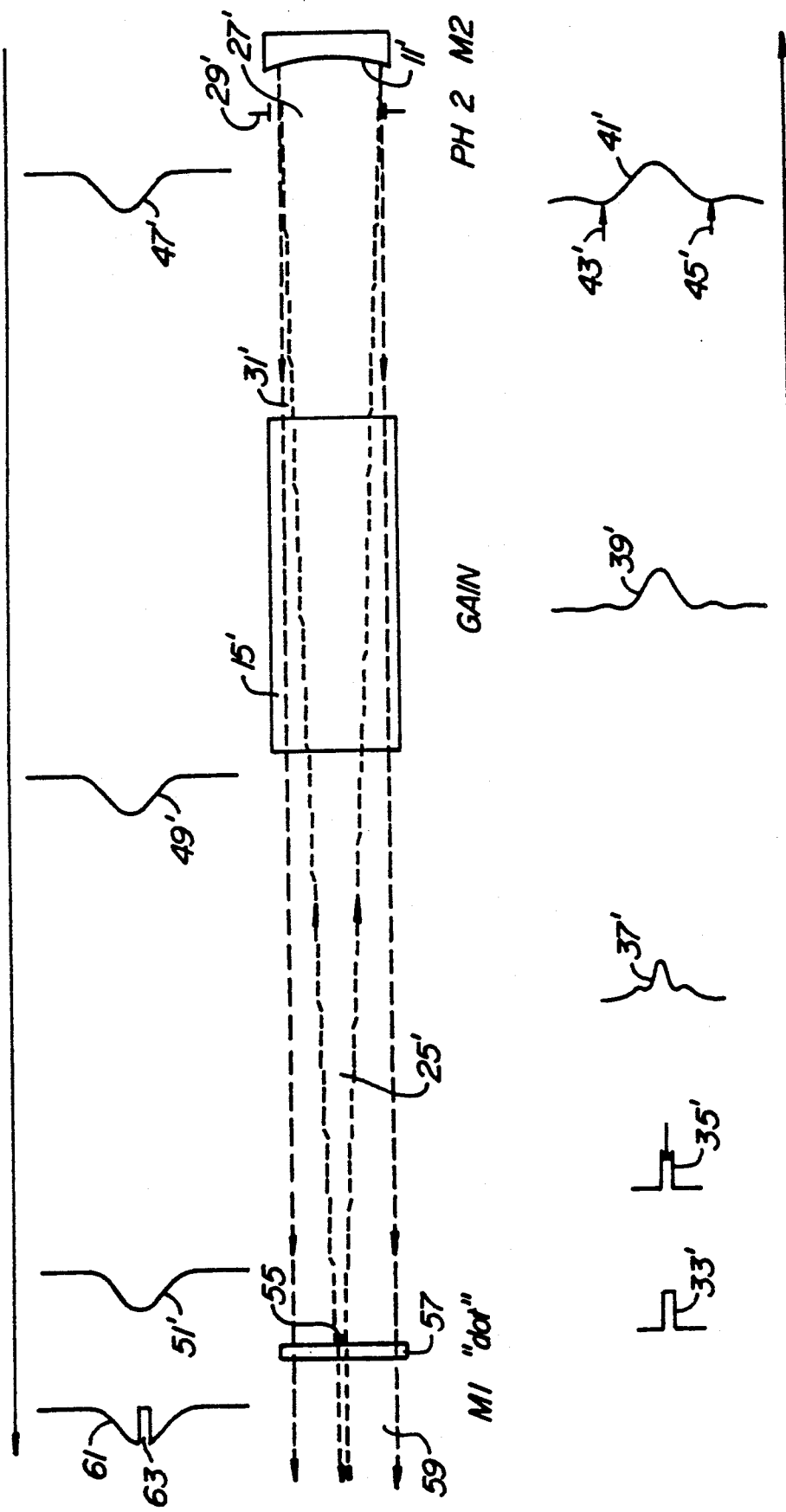
FIG. 2 schematically illustrates a resonator utilizing the present invention, according to a second embodiment.

Referring to FIG. 2, a variation of the resonator described with respect to FIG. 1 is illustrated, as a second embodiment. The elements of FIG. 2 which are common with those of FIG. 1 are shown with the same reference numbers, but with a prime (') added. The main difference is in providing the limiting end aperture in the form of a very small mirror surface 55. That small mirror reflects light into the beam 25' and its diameter controls its divergence. Sharp edges of the mirror 5 diffract the incident light 31' in the same manner as the edges of the aperture 23 in the embodiment of FIG. 1.

The small mirror 55 is attached to a support 57. This support can be configured in either of two different ways. In a first arrangement, the support 57 is opaque and thus absorbs the light of the beam 31' surrounding the mirror 55, just as the mask 21 absorbs the light of the beam 31 around the aperture 23 in the embodiment of FIG. 1. Output light can then be obtained from the embodiment of FIG. 2 by use of an optical element (not shown) similar to element 17 of FIG. 1.

However, FIG. 2 is illustrated with the support 57 being of the second configuration. That support is transparent in order to allow the beam 31' surrounding the mirror 57 to exit the resonate cavity in an output beam 59. An intensity distribution across the output beam is shown by the curve 61. That intensity distribution is a very smooth one except for a "notch" 63 in its middle. That notch is undesirable, but since the mirror 55 is extremely small anyway, that interruption in the smooth intensity distribution is also very small and dissipates quickly.

The advantage of the embodiment of FIG. 2 is that the output beam 59 is of higher intensity that than of the output beam 19 in the FIG. 1 embodiment, assuming that everything else remains essentially the same, since absorption of a great deal of energy in the light beam 31 by the mask 21 is avoided. However, the embodiment of FIG. 2 has a disadvantage that is very difficult to precisely manufacture the small mirror 55 and the support structure 57. The use of a separate mirror 13 and aperture 23 in the embodiment of FIG. 1 is generally preferred for that reason.

Each of the mirrors 13 and 55 of the respective FIG. 1 and FIG. 2 embodiments are illustrated to be substantially planar in shape to emphasize that it is diffraction from edges of the limiting apertures that causes the respective beams 25 and 25' to diverge. However, these mirror surfaces can be provided with some degree of curvature, either convex or concave, if desired. Even so, it is desirable that the divergence of the respective beams 25 and 25' be due predominately to the edge diffraction effects of the limiting apertures 23 and 55 in order to accomplish spatial filtering.

Referring to FIG. 3, an example of a complete laser structure utilizing the resonator of FIG. 1 is schematically illustrated. Planar end mirrors 65 and 67 of FIG. 3 correspond to the end mirrors 11 and 13, respectively, of FIG. 1. A mask 69 having a large aperture 71 of FIG. 3 corresponds to mask 29 and aperture 27 of FIG. 1. A mask 73 with a small pinhole aperture 75 of FIG. 3 serves the same function as previously described for the mask 21 and aperture 23 of FIG. 1. The laser amplifying medium is an Nd:YAG rod 77. A Pockels cell 79 cooperates with an output polarizer 81 to periodically generate laser output pulses in a beam 83. An acousto-optic modulator 85 is also provided for mode locking.

The laser arrangement of FIG. 3 is also shown to have a dye cell 87 positioned between the mask 73 and the mirror 67. It will be recalled from the discussion of FIG. 1 that the intensity distribution of the beam passing through the aperture 23 and onto the mirror 13 is substantially constant across its narrow width. Since a dye cell operates best when placed in a beam having a constant intensity distribution across it, the resonator structure of the present invention has an advantage of providing such a constant intensity profile beam in a convenient location for positioning the dye cell. This is in contrast to the SFUR design where the intensity profile at the mirror behind the pinhole is not uniform.

FIG. 4 illustrates another use of the resonator structure of the present invention Shown in that figure is a regenerative amplifier, using elements corresponding to those of the laser resonator of FIG. 3 and which are identified by the same reference numbers, but with a prime (') added. In this case, no dye cell is utilized. The amplifying resonator additionally provides an input polarizing plate 91 to receive a beam 93 to be amplified. The beam 93 comes from a suitable laser source. A second Pockels cell 95 cooperates with the polarizer 91 to periodically input energy from the beam 93. A quarter-wave plate 97 is also included.

Although specific applications of the present invention have been described with respect to the illustrative drawings, it will be understood that the invention is entitled to protection within the full scope of the appended claims.

It is claimed:

1. In a laser cavity of a type including a laser medium positioned along an optical axis, first and second light reflective structures positioned along said optical axis on opposite sides of the laser medium in a manner to define respective first and second ends of the cavity with a given optical length and functioning to cause light to oscillate back and forth therebetween within said cavity through said laser medium, and means within the cavity for providing an output of a portion of the oscillating light, the improvement wherein:

said first reflective structure includes a first mirror with a given radius of curvature and a limiting first aperture positioned to reflect an incident light beam in a first direction through the laser medium and onto the second reflective structure, said second reflective structure includes a second aperture having a size that is significantly smaller than that of the first aperture and of a size so that light diffraction by said aperture substantially entirely causes light reflected therefrom to diverge as a light beam in a second direction through the laser medium and onto the first reflective surface such that the beam at the first reflective surface is much larger in cross-section than the second aperture, and the first and second apertures and the given radius of curvature of the first mirror are cooperatively dimensioned to cause the size of the beam traveling through the laser medium in said first direction to substantially fill the laser medium.

2. The laser cavity improvements according to claim 1 wherein the size of the first and second apertures are such that the diverging light beam traveling in the first direction substantially fills the second aperture with a central lobe of light distribution thereacross.

3. The laser cavity improvements according to claim 1 wherein the dimensions of the first and second apertures and the given radius of curvature of the first mirror are further cooperatively sized to cause the light beam in a first direction to be substantially collimated.

4. The laser cavity improvements according to claim 1 wherein said second reflective structure includes a second mirror separated a short distance behind a mask containing said aperture.

5. The laser cavity improvements according to claim 4 wherein said second mirror is substantially planar in shape.

6. The laser cavity improvements according to claim 4 which additionally comprises a dye cell positioned between said second mirror and said mask.

7. The laser cavity improvements according to claim 1 wherein said second reflective structure aperture includes a second mirror in the shape of said second aperture and with a non-reflective surface surrounding it, edges of said second mirror causing the divergence of the light beam in the second direction.

8. The laser cavity improvements according to claim 7 wherein said second mirror is substantially planar in shape.

9. The laser cavity improvements according to claim 1 wherein the optical length of the cavity is such that the first mirror is substantially within a far field of the light beam traveling in the second direction from the second aperture.

10. The laser cavity improvements according to claim 1 wherein the relative size of the first and second apertures, a curvature of the second mirror and the optical length of the cavity cooperate together to form a spatial filter.

11. The laser cavity improvements according to claim 1 wherein said light output means includes an output mirror surface provided as part of said second reflective structure surrounding said second aperture and in a shape to direct incident light thereon out of said cavity.

12. The laser cavity improvements according to any one of claims 1, 4, 7 or 10, wherein said laser cavity is characterized by being a geometrically stable optical type in the absence of said second aperture limiting the size of the beam reflected from the second light reflective structure.

13. The laser cavity improvements according to any one of claims 1, 4, 7 or 10, wherein said laser cavity is characterized by being a geometrically unstable optical type in the absence of said second aperture limiting the size of the beam reflected from the second light reflective structure.

14. The laser cavity improvements according to any one of claims 1, 4, 7 or 10, wherein no focus of light to a spot is caused to occur in said cavity.

15. In a laser cavity of a type including a laser medium positioned along an optical axis, first and second light reflective structures positioned along said optical axis on opposite sides of the laser medium in a manner to define respective first and second ends of the cavity with a given optical length and functioning to cause light to oscillate back and forth therebetween within said cavity through said laser medium, and means within the cavity for providing an output of a portion of the oscillating light, the improvement wherein one of said first and second cavity end reflective structures includes an aperture having a size that is significantly smaller than a cross-sectional size of a beam of the light striking it from one direction and characterized by causing light reflected from it in an opposite direction to be diverged substantially entirely by diffraction from the aperture in order to substantially increase the beam cross-section, and further wherein the first and second reflective structures are characterized by forming a geometrically stable resonator in the absence of said aperture limiting the size of the beam reflected in an opposite direction.

16. The laser cavity improvements according to claim 15 wherein said one reflective structure includes a mirror surface separated a short distance behind a mask containing said aperture, and wherein the resonator is characterized by being a stable type when the mask is removed from the cavity.

17. In a laser cavity of a type including a laser medium positioned along an optical axis, first and second light reflective structures positioned along said optical axis on opposite sides of the laser medium in a manner to define respective first and second ends of the cavity with a given optical length and functioning to cause light to oscillate back and forth therebetween within said cavity through said laser medium, and means within the cavity for providing an output of a portion of the oscillating light, the improvement wherein one of said first and second cavity end reflective structures includes an aperture having a size that is significantly smaller than a cross-sectional size of a beam of the light striking it from one direction an characterized by causing light reflected from it in an opposite direction to be diverged by diffraction from the aperture in order to substantially increase the beam cross-section, said one reflective structure aperture including a mirror surface in the shape of said aperture and with a non-reflective surface surrounding it, said second mirror causing divergence of a light beam by diffraction at its sharp edges, and wherein the resonator is characterized by being of a stable type when the limiting aperture is removed by extending the mirror beyond its sharp edges with its same radius of curvature, and further wherein the first and second reflective structures are characterized by forming a geometrically stable resonator in the absence of said aperture limiting the size of the beam reflected in an opposite direction.

18. A laser cavity of a type including a laser medium positioned along an optical axis, a first light reflective structure of concave shape with a given curvature and having a first circular aperture with a first given diameter of an edge, a second light reflective structure having a second circular aperture with a second given diameter of an edge which is significantly less than said first given diameter, said first and second light reflective structures being positioned along said optical axis on opposite sides of the laser medium in a manner to define ends of the cavity with a given optical length therebetween and functioning to cause light to oscillate within said cavity through said laser medium as a first beam traveling from said first to said second light reflective structure and as a second beam traveling from said second to said first light reflective structure, and means within the cavity for providing an output of a portion of the oscillating light, said laser cavity elements characterized in that:

a diffraction effect of the second aperture edge is substantially the only mechanism diverging the second beam and causing it to enter the far field as it reaches the first reflective structure, the second beam thereby having substantially an Airy pattern intensity distribution thereacross at said first aperture, wherein a central intensity distribution lobe is surrounded by a region of substantially zero intensity level, said first aperture edge is positioned substantially coincident with said substantially zero intensity region of said second beam, whereby said first beam reflected from the first reflective structure includes the central lobe intensity distribution substantially without diffraction effects being introduced by the edge of said first aperture, said given curvature of the first reflective structure is such that said first beam substantially fills the laser medium and strikes the second reflective structure with a center beam portion having substantially uniform intensity across the second aperture, and said output means is positioned to direct out of said cavity a portion of the intensity of the first beam after passing through said laser medium, whereby said output light is of high quality.

19. The laser cavity according to claim 18 wherein said first and second given diameters and the given curvature of the first reflective structure are further cooperatively sized to cause said first light beam to be substantially collimated.

20. The laser cavity according to claim 18 wherein said second reflective structure includes a mirror separated a short distance behind a mask containing said second aperture.

21. The laser cavity according to claim 20 wherein said second reflective structure mirror is substantially planar in shape.

22. The laser cavity according to claim 20 which additionally comprises a dye cell positioned between said second mirror and said mask.

23. The laser cavity according to claim 18 wherein said second reflective structure includes a mirror in the shape of said second aperture with a non-reflective surface surrounding it, an outer edge of said second reflective structure mirror being the edge of said aperture.

24. The laser cavity according to claim 23 wherein said second reflective structure mirror is substantially planar in shape.

* * * * *

UNITED STATES PATENT AND TRADEMARK OFFICE
CERTIFICATE OF CORRECTION

PATENT NO. : 5,065,407

DATED : November 12, 1991

INVENTOR(S) : Paul H. Pax

It is certified that error appears in the above-identified patent and that said Letters Patent is hereby corrected as shown below:

Column 8, line 38, in Claim 17:   replace "an" with --and--

Column 8, line 44, in Claim 17:   delete "second"

Signed and Sealed this

Second Day of March, 1993

Attest:

STEPHEN G. KUNIN

Attesting Officer    Acting Commissioner of Patents and Trademarks